United States Patent [19]

Miller

[11] Patent Number: 4,742,904

[45] Date of Patent: May 10, 1988

[54] METHOD AND APPARATUS FOR IMPROVING THE TURNING CAPABILITY OF AN ARTICULATED TRAMMING CONVEYOR

[75] Inventor: Thomas R. Miller, Waynesburg, Pa.

[73] Assignee: Consolidation Coal Company, Pittsburgh, Pa.

[21] Appl. No.: 914,101

[22] Filed: Oct. 1, 1986

[51] Int. Cl.$^4$ .................................... B65G 19/28
[52] U.S. Cl. .............................. 198/735; 198/861.2
[58] Field of Search .................. 198/735, 861.2, 310, 198/311, 313

[56] References Cited

U.S. PATENT DOCUMENTS 2,903,122  9/1959  Geilenberg ................. 198/861.2
2,910,169  10/1959  Russell ....................... 198/861.2

FOREIGN PATENT DOCUMENTS 3339404  5/1984  Fed. Rep. of Germany ...... 198/735
1373170  11/1974  United Kingdom ............. 198/861.2

Primary Examiner—Joseph E. Valenza
Attorney, Agent, or Firm—Alan N. McCartney; William J. Miller

[57] ABSTRACT

An improved method and apparatus is disclosed for turning an articulated self-propelled conveyor which is adapted either for conveying materials or for movement along the surface of the earth, including a plurality of segments pivotally joined to form an elongated housing. The housing has an upper and lower surface with jacks attached to the segments for selectively lifting or lowering the elongated housing. A conveying apparatus is mounting along the upper and lower surfaces and connected between the upper and lower surfaces. Transverse flights are mounted to the conveying apparatus such that when the jacks have elevated the elongated housing the conveying apparatus will move material along the upper surface of the elongated housing and when the jacks have lowered the elongated housing against the surface of the earth, the conveyor apparatus will move the elongated housing along the surface of the earth. The turning capability of the self-propelled conveyor is enhanced by tapering the surfaces of the transverse flights which are in contact with the earth in a manner so that when the housing turns the portion of the conveyor in the turn will tilt into the turn so that the vertical axis of the segments in the turn will be slanted toward the inside radius of the turn.

3 Claims, 2 Drawing Sheets

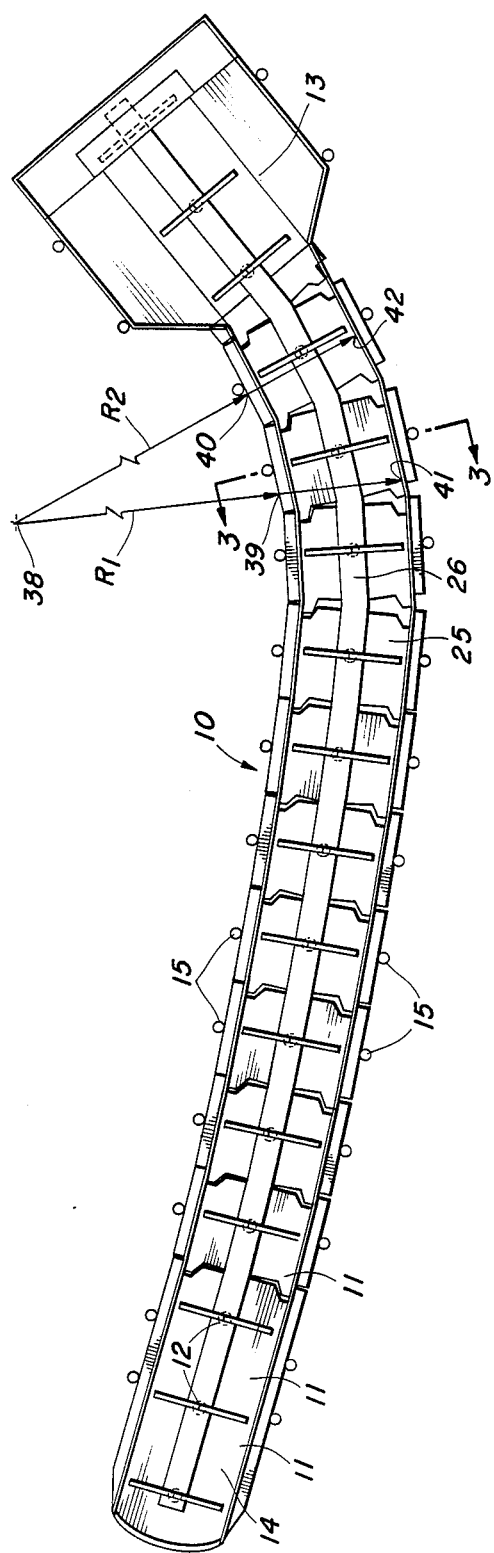
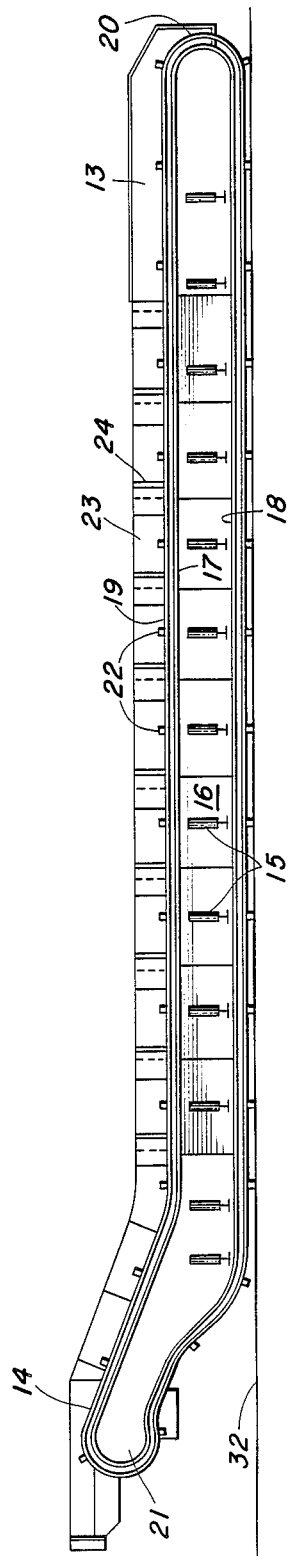

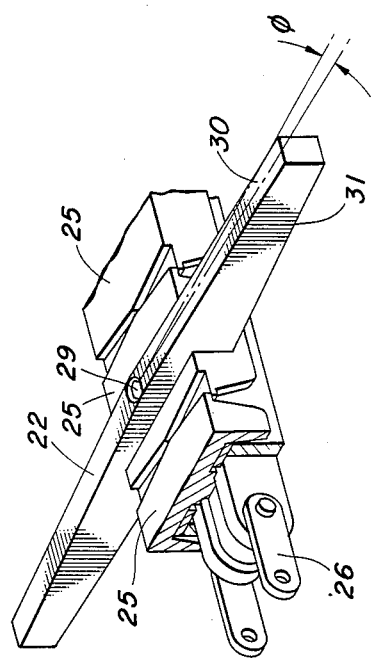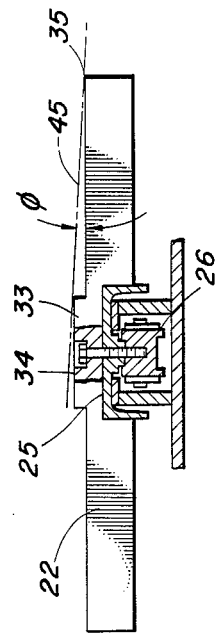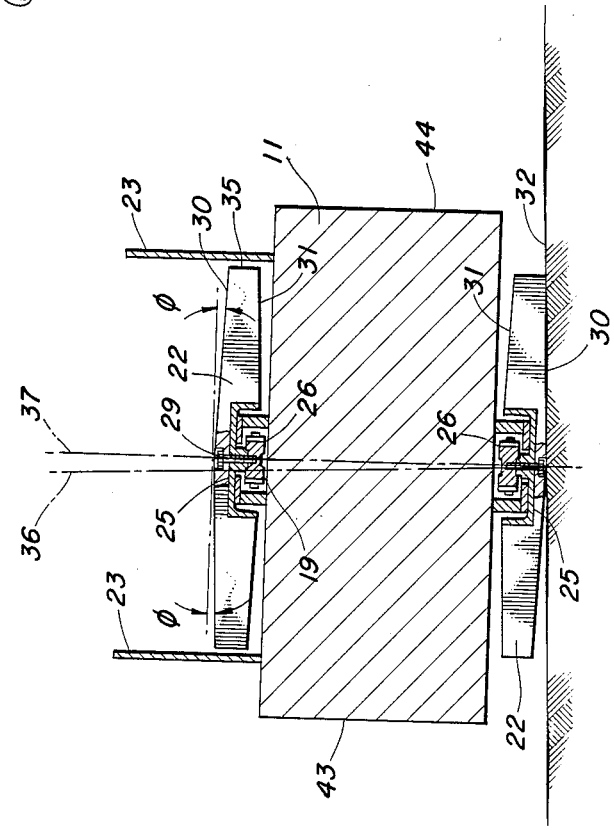

METHOD AND APPARATUS FOR IMPROVING THE TURNING CAPABILITY OF AN ARTICULATED TRAMMING CONVEYOR

BRIEF DESCRIPTION OF THE PRIOR ART

The best prior art known to Applicant is a German Gebrauchsmuster No. G 84 30 378.6, filed Oct. 16, 1984, and published in the Gazette on Apr. 11, 1985. This patent discloses a portion of a conveyor apparatus adapted for moving materials in one direction and for tramming along the surface of the earth.

British Patent Specification No. 1373170 filed on Feb. 24, 1972, and published Nov. 6, 1974, likewise shows a form of tramming conveyor which utilizes an elongated housing divided into a plurality of inner connected segments. A conveyor mechanism travels along the upper surface and lower surface of the elongated housing in the manner to either move material or move the conveyor to a new location. The conveyor also contains a plurality of jacks which will lift the conveyor off the ground during the movement of materials and lower the conveyor onto the ground for movement of the conveyor itself.

BRIEF DESCRIPTION OF THE INVENTION

This invention relates to a method and apparatus for improving the turning capabilities of the articulated self-propelled type conveyor which is set out in the prior art. It is utilized for conveying materials during one mode of operation and for moving the conveyor itself to a new location during a second mode of operation. The invention basically provides for tapering the conveyor flights so that when the conveyor flights are in contact with the ground during the second mode where the conveyor itself is being moved, the conveyor flights will permit tilting of the conveyor in a turn, acting as a form of differential, thus, providing for faster movement of the conveyor in the outside portion of the turn and providing for slower movement of the conveyor on the inside portion of the turn. The improved conveyor is particularly well suited for hard ground surfaces.

BRIEF DESCRIPTION OF THE FIGURES

FIG. 1 is a top view of a conveyor executing a turn;

FIG. 2 is a side view of a conveyor illustrated in FIG. 1;

FIG. 3 is a cross-sectional view of the conveyor in the turn as illustrated by lines 3—3 of FIG. 1;

FIG. 4 is an orthographic view of a modified flight for accomplishing the method and apparatus of improving the conveyor during the turn; and, FIG. 5 is a modified form of the apparatus illustrated in FIG. 4.

DETAILED DESCRIPTION OF THE INVENTION

Referring to all of the drawings but in particular to FIGS. 1 and 2 a articulated tramming conveyor is illustrated generally referred to by the number 10. Articulated tramming conveyor 10 is composed of a plurality of segments 11. Each of segments 11 is joined by a vertical pin 12 which permits articulation of each of segments 11 about the axis of vertical pin 12. The mating segments between succeeding segments 11 which are connected by pin 12, have enough play in the connection to provide for at least a three degree rotation horizontally about vertical pin 12. Conveyor 10 further has an input end 13 and an output end 14. A plurality of jacks 15 are attached to side walls 16 of segments 11 on each side. Said jacks 15 providing features to be described later in this specification. Each segment, in addition to side wall 16, has an upper surface 17 and a lower surface 18.

A conveying apparatus 19 is mounted as illustrated in FIGS. 3, 4 and 5 to upper surface 17 of conveyor 10 and lower surface 18 of conveyor 10. Conveying apparatus 19 passes from upper surface 17 to lower surface 18 around an end 20 through any usual means such as a large sprocket gear or other suitable device. Conveyor 10, likewise, passes around an end 21 in any suitable manner such as that described for end 20.

Attached to conveying apparatus 19 is a plurality of transverse bars 22 which extend the full width of upper surface 19 and lower surface 18. Side walls 23 each have a telescoping inner connection 24 to permit articulation of conveyor 10. Side walls 23 pass the full length of conveyor 10 from input end 13 to output end 14. Upper surface 19 of conveyor 10 is made of a plurality of interleaving surfaces 25. Transverse bars 22 and interleaving surface 25 are moved by a center chain drive 26.

Referring in particular to FIGS. 4 and 5, chain drive 26 is illustrated coupled to interleaving surface 25. Connected to one interleaving plate 25 is transverse rod 22 which is coupled by means of a bolt 29, for example, through interleaving plate 25 and into chain drive 26.

Referring in particular to chain drive 26 in FIG. 3, the transverse bars are illustrated in particular. Each transverse bar 22 is provided with a tapered surface 30 having a taper 0. In the preferred embodiment, 3° is used, but the invention is not so limited as to the actual number of degrees of taper 0. Both sides of transverse bar 22 have a corresponding three degree taper. The underside of bar 22 is likewise illustrated as having a slight taper 31. Taper 31 is for the purpose of providing some clearance for bar 22 as it passes over upper surface 19 of segment 11.

FIG. 5 illustrates a modified form of traverse bar 22 which has a block or addition 33. Block 33 is of a selected height so that the difference in upper surface 34 and tip 35 of transverse bar 22 will provide effectively the same taper 0 as illustrated by number 45 as did actual taper 30 placed on transverse bar 22 in FIG. 3.

Referring to FIGS. 2 and 3, segments 11 is illustrated as sitting on surface of the earth 32 with the torsional factors being transferred from segments 11 as conveyor 10 enters a turn. Segments 11 will tilt as illustrated in FIG. 3 by the difference in angle between vertical center line 36 and actual titled center line 37. Such a tilt will approximate three degrees in the preferred embodiment since that is the actual taper placed on transverse rod 22.

OPERATION

One of the problems with a tramming conveyor, as illustrated in FIGS. 1 and 2, is when the conveyor begins to negotiate a turn either to the right or to the left of the longitudinal center line of the tramming conveyor. As a tramming conveyor begins to negotiate a turn about point 38, for example, it will begin to turn a radius R1 or R2 as it progresses from point 39 to point 40. If the length of the circumference exhibited by R1 or R2 is calculated it is obvious that the distance from point 39 to point 40 is less than point 41 to point 42 located by the extension of R1 and R2, respectively.

Thus, tramming conveyor 10 on the portion closest to point 38 which is represented by distances 30 and 40, must move through a much smaller distance than the portion of the tramming conveyor on the outside away from radius point 38 as represented by points 41 and 42. The difference in the distance the inside and the outside of the tramming conveyor must move results in the conveyor slipping and providing extreme difficulties in making such a turn.

This invention relates to a specific method for correcting this problem. The correction requires the tapering of transverse rods 22 which are in contact with surface 32 of the earth. The solution is solved by tapering transverse bars 22 by an amount 0 from the center of transverse bars at attachment bolt 29 to its end 35. The taper is provided on both sides of transverse rod 22 so that both directions of the turn can be accommodated, either to the right or to the left of the center line of the elongated housing of articulated conveyor 10.

As illustrated in FIG. 3, when the conveyor is actually negotiating a turn, such as that illustrated in FIG. 1, about a radius point 38, then conveyor 10 will tilt from vertical axis 36 to tilted axis 37. The tilt will provide movement on the outside of tramming conveyor 10 away from turn radius 38, that is from points 41 to 42, since the outside section 43 must travel farther in the same period of time as does inside section 44 as illustrated in FIG. 3. Since the outside sections from points 41 to 42 are not in contact with the surface of earth 32, such movement is easily effected.

Referring to FIG. 5, the modified version of the taper section illustrated in FIGS. 3 and 4 is illustrated. FIG. 5 will provide a method for modifying existing transverse rods by welding or attaching block 33 to the center of transverse bar 42. The height of block 33 will be sufficient so that the distance from bolt 34 to end 35 will provide a three degree taper along the dotted line 45. The actual height of block 33, as previously discussed, will depend upon length of transverse rod 22.

It is obvious that changes and modifications can be made in this invention and still be well within the spirit and scope of this invention as described in the specification and appended claims.

What I claim is:

1. An improved apparatus for turning an articulated, self-propelled conveyor adapted either for conveying materials or for movement along the surface of the earth including a plurality of segment means pivotally joined to form an elongated housing which has a longitudinal axis and which has an upper and lower surface, jack means attached to said segment means for selectively lifting or lowering said elongated housing and a conveying means having spaced transverse flights, said conveying means movably attached to said upper and lower surface with means coupling said conveying means from said upper to said lower surface such that when said jack means lowers said housing means to said surface of the earth said conveyor means when moved will propel said housing means along the surface of the earth, and when said jack means raises said housing means, movement of said conveying means will transfer material longitudinally along the upper surface of said elongated housing, an improvement in propelling a portion of said elongated housing in a change of direction to said longitudinal axis comprising:

means to permit, on said surface of said flights in contact with said surface of the earth, tilting the portion of said plurality of segment means negotiating said change in direction, said tilt being toward the radius of said change in direction and wherein each of said plurality of segment means is configured and said each jack means is mounted on said segment means when retracted, to provide clearance between said segment means and said retracted jack means with said surface of the earth as each of said segment means is tilted.

2. An improved apparatus as described in claim 1 wherein said means to permit tilting said conveyor comprises a taper on the surface of each of said transverse flights in contact with said surface of said earth, each of said flights in contact with the surface of the earth having a center and end portions, said taper increasing from said center of said flight to said end portions whereby as said elongated housing enters an arcuate turn in longitudinal direction, said conveyor will tilt in the direction of the center of said arc moving the weight of said elongated housing over said tapered portion of said flight which is on the side of said arcuate turn.

3. Apparatus as described in claim 1 wherein each flight is elongated with an upper surface and a lower surface and wherein said lower surface is centrally attached to said conveying means and wherein a raised portion is centrally attached to said upper surface, whereby when said upper surface is in contact with said surface of the earth and said elongated housing enters an arcuate turn in longitudinal direction of movement, said segments of said elongating in said arcuate turn will tilt in the direction of said turn.

* * * * *